United States Patent Office 3,192,288
Patented June 29, 1965

3,192,288
HIGH IMPACT STRENGTH BLEND OF ISOTACTIC POLYPROPYLENE, POLYETHYLENE AND POLYISOBUTYLENE
Andrew F. Sayko and James P. Forsman, Westfield, N.J., assignors to Esso Research and Engineering Company, a corporation of Delaware
No Drawing. Filed Aug. 21, 1961, Ser. No. 132,604
4 Claims. (Cl. 260—897)

This invention relates to improvements in the low temperature and impact resistance characteristics of polypropylene plastics. More particularly, it relates to blends of low pressure isotactic polypropylene, Vistanex, i.e., the well-known polyisobutylene having a Staudinger molecular weight of 60,000 to 80,000, and small amounts of high pressure polyethylene and an improved method of making these blends.

In the recent past, so-called "low pressure" polypropylene has been attracting increasing attention as a plastic competitive with polyethylene. This polymer has been prepared by the new well known process of polymerizing propylene with catalyst systems made up of reducible, heavy, transition metal halides and a reducing, metal-containing compound, to high density, isotactic, high molecular weight, solid, relatively linear products. One of the drawbacks of such "low pressure" polypropylene plastics has been their excessive brittleness at low temperatures. In particular, this has tended to limit their utility as a packaging material for frozen foods, wire and cable insulation, plastic pipe and bottles, etc. Low temperature brittleness is commonly measured by the Bell Brittleness Temperature Test (ASTM Test D–746). Impact resistance (ASTM Test D–256), which is another form of brittleness measurement, represents a similar problem.

It has now been found that the low temperature and impact resistance properties of the polypropylene are improved by blending it with rubbery Vistanex of controlled molecular weight and small amounts of polyethylene of controlled properties. The resulting compositions have a Bell brittleness temperature as low as −50° F. and improvements in other properties such as impact and tear strengths.

It is surprising that this improvement should be obtained since the Vistanex itself does not impart a qualitative improvement even approaching that of the blend of the three materials. The small amounts of polyethylene itself also fails to give equivalent improvement in polypropylene blends. In addition, the use of the three components makes the processing into the blend compositions much more efficient and avoids problems of incompatibility.

The low pressure isotactic polypropylene polymers used can have molecular weights in the range of about 50,000 to 300,000 or even as high as 3,000,000 as determined by the intrinsic viscosity method using the I. Harris Correlation (J. Polymer Science, 8, 361, 1952). The polymers have a high degree of crystallinity and a low solubility in n-heptane. The density (73° F./g. cc.) is in the range of about 0.88 to 0.91 (i.e., molded pads annealed in boiling water for 1 hr.; density determined by a weight difference in alcohol and air). The polypropylene is utilized in an amount of from 70 to 90 weight percent based on the total blend.

Vistanex is employed in an amount of from 9.5 to 28.5 wt. percent based on the total blending. Generally Vistanex is employed in an amount of from 9.5 to 25 wt. percent based on the total blending.

The polyethylene employed is the so-called lower density, high pressure polyethylene, also known as DYLT (see Golding, "Polymers and Resins" (1959), pages 374 to 385). The material used herein has a Staudinger molecular weight of 12,000 to 28,000 and a density of about 0.92 (density determined in same manner as for polypropylene). The polyethylene is employed in an amount of from 0.5 to 5.0 weight percent, generally from 2.0 to 5.0 weight percent, based on the total blend.

It is significant that the use of Vistanex or polyethylene outside of the quantity or molecular weight limitations indicated herein does not yield equivalent results.

The admixing of the polymers can be done by conventional means such as by milling, extruding, Banbury mixing and other known procedures. It is particularly preferred that the polyethylene first be admixed with the polyisobutylene at a temperature in the range of 250° to 350° F. for a time interval of 1 to 5 minutes. The blend of these two components is then admixed with the polypropylene at a temperature of 340° to 380° F. for a time interval conveniently in the range of 2 to 5 minutes. The polypropylene can all be admixed with the other components or added stepwise. This procedure can be followed with standard equipment such as Banbury mixing, stated previously.

This invention and its advantages will be better understood by reference to the following examples.

In Examples 1 to 3, compositions containing only polypropylene and Vistanex were made by adding the latter to the molten polypropylene on the mill. When three polymers were employed, the DYLT was incorporated into the Vistanex and polypropylene then added to this mixture on the mill. By this procedure the Vistanex is plasticized prior to blending with polypropylene. Milling periods of ten minutes were maintained for all compounds.

Test specimens consisted of 75 mil compression molded pads and 2 mil extruded film. The former were molded at 400° F. and were used for determining tensile strengths and Bell brittleness values. Yield tensiles were measured at 75° F. on an Instron apparatus at an extension rate of 2 in./min. Brittleness measurements were made on ¼" x 1¼" strips and the temperature noted when more than 2 of the 4 samples fractured under impact.

Films were extruded with the Killion small scale extruder with the die at 500° F., barrel #1 at 450° F. and barrel #2 at 475° F. In order to equalize orientation effects a constant pull down rate was maintained. Film impact and tear strengths were obtained with the Elemendorf Tearing Tester.

EXAMPLE 1

Various blends were prepared by mill mixing at 350° F. The effect of minor amounts of the polyethylene specified were determined in compositions of polypropylene and polyisobutylene. Each of the polymers employed had the physical characteristics within the ranges specified herein. The data were as follows with the figures on the blend showing weight percent quantities of polypropylene, polyisobutylene, and polyethylene respectively:

| Blend | 75° F., 40° F. impact, p.s.i. | 75° F., 40° F. tear, g./mil, TD |
|---|---|---|
| (90–10–0) | 867–350 | 262–35 |
| (90–9.5–0.5) | 2,511–783 | 702–99 |
| (90–9–1) | 1,680–680 | 496–90 |
| (90–7.5–2.5) | 2,216–566 | 800–101 |

These figures demonstrate the marked improvement in impact and tear strength (Elmendorf Tearing Tester) obtained through the incorporation of minor amounts of polyethylene.

EXAMPLE 2

Blends were prepared with 80% polypropylene using materials similar to those in Example 1. The results were as follows:

| Blend | 75° F., 40° F. impact, p.s.i. | Bell brittleness, ° F. |
|---|---|---|
| (80-20-0) | 1,445, 789 | 0 |
| (80-19-1) | 3,010, 1,397 | −20 |
| (80-18-2) | 2,751, 1,024 | −20 |
| (80-15-5) | 2,415, 950 | −10 |

These results further demonstrate the marked improvement in impact strength and low temperature flexibility given by polyethylene addition.

EXAMPLE 3

A third series of runs were made with 70% polypropylene. The results were as follows:

| Blend | 75° F., 40° F. impact, p.s.i. | Bell brittleness, ° F. |
|---|---|---|
| 7 (70-30-0) | 2,204, 1,240 | −35 |
| 16 (70-28.5-1.5) | 3,010, 2,234 | −50 |
| 25 (70-27-3) | 2,998, 891 | −50 |

These results show that as polypropylene content decreases, the effectiveness of the polyethylene also decreases at concentrations above 1.5%. Effective blends, therefore, must contain a minimum of 70% polypropylene.

Other tests demonstrated that the use of L-120 (100,000 to 120,000 molecular weight) and L-250 (200,000 to 250,000 molecular weight) polyisobutylene gave a deterioration in impact resistance, tear strength, and Bell brittleness. These high molecular weight Vistanex polymers also do not give smooth, homogenous blends due to their extremely high viscosity.

EXAMPLE 4

Blends of 84-14-2 were prepared by Banbury mixing and also by mill mixing. L-80 refers to polyisobutylene of the molecular weight range of this invention and DYLT refers to polyethylene covered herein. Mill mixing was conducted by blending the DYLT into the L-80 at 330° F. and adding polypropylene and blending at 370° F.

Banbury procedure: Time, minutes
  Add L-80 and DYLT—Banbury at 330° F_____ 0
  Add ¼ polypropylene to make mixture flux_____ 2
  Add remainder polypropylene_____ 8
  Dump—Final temperature=370° F_____ 14

*Test results*

|  | Banbury | Mill mix |
|---|---|---|
| Bell brittleness, ° F | 0 | 0 |
| Impact, p.s.i.: |  |  |
| 75° F | 1,608 | 1,806 |
| 40° F | 427 | 319 |
| Tear strength, p.s.i.: |  |  |
| 75° F | 216 | 141 |
| 40° F | 53 | 42 |

This example demonstrates that Banbury and mill mixing give equivalent results.

EXAMPLE 5

Since one of the main applications for this type of blend is in the heavy duty shipping bag market, the durability of the films of the compositions of this invention was tested by drop tests. These tests were carried out on bags filled with 50 pounds of dry sand and tied at both ends with cord. The bags were dropped repeatedly from a height of four feet on to smooth concrete. A standard order of dropping was used—front, side, rear, side, end, etc. The following table shows the results obtained on polypropylene, Vistanex blend with and without added polyethylene compared with control samples.

| Blend | Bag thickness, mils | Number of drops to break 75° F. | Number of drops to break 40° F. |
|---|---|---|---|
| Polypropylene, L-80 and DYLT | 4 | 10 | 6 to 12(1) |
| Polypropylene and L-80 | 5 | 5-10 | 4-5 |

(1) Three of five specimens were unbroken after 12 drops.

Even at only 4 mils thickness, the ternary blends' cold performance is definitely better than that of polypropylene and Vistanex alone.

The advantages of this invention will be apparent to those skilled in the art. Improvements in the physical characteristics of the polypropylene plastics are obtained in an efficient and economical manner. Chiefly improved are the Bell brittleness temperature characteristics, tear strength and impact resistance.

It is to be understood that this invention is not limited to the specific examples which have been offered merely as illustrations and that modifications may be made without departure from the spirit of the invention.

What is claimed is:

1. A composition of matter of improved low temperature and impact resistance characteristics comprising a blend of solid, isotactic polypropylene, polyisobutylene having a molecular weight in the range of 60,000 to 80,000 and polyethylene having a molecular weight in the range of 12,000 to 28,000 and a density of 0.92, the polymers being utilized in the blend in amounts of respectively 70 to 90 weight percent, 9.5 to 28.5 weight percent, and 0.5 to 5.0 weight percent.

2. A process for preparing a polymer blend of improved low temperature and impact resistance characteristics, said blend containing from 70 to 90 weight percent solid isotactic polypropylene, from 9.5 to 28.5 weight percent polyisobutylene having a molecular weight in the range of 60,000 to 80,000, and from 0.5 to 5.0 weight percent polyethylene having a molecular weight in the range of 12,000 to 28,000 and a density of 0.92 which comprises admixing the polyethylene and polyisobutylene at a temperature in the range of from 250 to 350° F. and then admixing this mixture with the polypropylene at a temperature in the range of from 340° to 380° F.

3. The process of claim 2 in which the polypropylene is added to the mixture of the other materials in a stepwise manner.

4. A composition of matter comprising a blend of 70 to 90 percent by weight of crystalline polypropylene, 2 to 5 percent by weight of polyethylene and 9.5 to 25 percent by weight of rubbery polyisobutylene.

References Cited by the Examiner
UNITED STATES PATENTS
2,854,435   9/58   Briggs et al. _____ 260—897
2,956,042  10/60   Underwood et al. _____ 260—897
2,993,028   7/61   Ranalli _____ 260—897

MURRAY TILLMAN, *Primary Examiner.*
WILLIAM H. SHORT, LEON J. BERCOVITZ,
*Examiners.*